United States Patent
Potter et al.

(10) Patent No.: US 8,756,739 B1
(45) Date of Patent: Jun. 24, 2014

(54) AUTOMATIC SOLAR POWER SURFACE-CLEANER

(71) Applicant: Taft Instruments, Inc., Los Gatos, CA (US)

(72) Inventors: Scott Potter, Los Gatos, CA (US); Dia Potter, Los Gatos, CA (US)

(73) Assignee: Taft Instruments, Inc., Los Gatos, CA (US)

( * ) Notice: Subject to any disclaimer, the term of this patent is extended or adjusted under 35 U.S.C. 154(b) by 0 days.

(21) Appl. No.: 13/761,612

(22) Filed: Feb. 7, 2013

Related U.S. Application Data

(60) Provisional application No. 61/708,529, filed on Oct. 1, 2012.

(51) Int. Cl.
 *B08B 7/00* (2006.01)
 *B08B 6/00* (2006.01)

(52) U.S. Cl.
 USPC .............................................. 15/1.51; 134/1

(58) Field of Classification Search
 USPC ............................................... 134/1; 15/1.51
 See application file for complete search history.

(56) References Cited

U.S. PATENT DOCUMENTS

| | | | |
|---|---|---|---|
| 5,824,203 A | | 10/1998 | Remo |
| 6,028,291 A | * | 2/2000 | Heisler ..................... 219/203 |
| 6,076,216 A | * | 6/2000 | Biryukov ................... 15/1.51 |
| 6,744,698 B2 | | 6/2004 | Koyama et al. |
| 6,911,593 B2 | | 6/2005 | Mazumder et al. |
| 8,046,101 B2 | | 10/2011 | Hisatani et al. |
| 8,240,320 B2 | * | 8/2012 | Mertins et al. ............. 134/172 |
| 8,323,421 B2 | * | 12/2012 | Lee ........................... 134/56 R |
| 8,500,918 B1 | * | 8/2013 | Meller et al. .............. 134/56 R |
| 2006/0048800 A1 | * | 3/2006 | Rast et al. ................. 134/56 R |

(Continued)

FOREIGN PATENT DOCUMENTS

| | | |
|---|---|---|
| CN | 202238825 U | 5/2012 |
| EP | 2366964 (A1) | 9/2011 |
| JP | 57156054 A | 9/1982 |

OTHER PUBLICATIONS

"Electroclean—Electrostatic Surface Cleaning", ElectroClean—electrostatic surface cleaning—Fraunhofer Institute for Interfacial Engineering and Biotechnology—www.igb.fraunhofer.de/en/competences/physical-process-technology/electromagnetical-fields/electroclean.html.

(Continued)

*Primary Examiner* — Alexander Markoff
(74) *Attorney, Agent, or Firm* — Schwegman, Lundberg & Woessner, P.A.

(57) ABSTRACT

Various embodiments herein include at least one of systems, methods, and software to facilitate automatic solar power surface-cleaning. Such embodiments include at least one automatic solar power surface-cleaning robot that uses no water or external power, continuously cleans the solar power surfaces and requires no maintenance or external power. The solar power surface-cleaning robot is easy to retrofit in an existing solar power generation plant. An automatic solar power surface-cleaner uses high-voltage AC electric fields to sweep particulates and debris as the robot traverses the surface to be cleaned. Photovoltaic solar cells supply the power for the robot. No external power is required. The robot clamps to the surface to be cleaned at the edges using motor driven rollers. Electronics inside the device generate high-voltage AC that is applied to conductors close to the surface to be cleaned.

10 Claims, 9 Drawing Sheets

(56) References Cited

U.S. PATENT DOCUMENTS

| | | | |
|---|---|---|---|
| 2007/0017567 A1 | 1/2007 | Gronet et al. | |
| 2008/0178408 A1* | 7/2008 | King | 15/250.06 |
| 2009/0266353 A1* | 10/2009 | Lee | 126/593 |
| 2010/0206294 A1 | 8/2010 | Blair et al. | |
| 2010/0212093 A1* | 8/2010 | Pak et al. | 15/97.1 |
| 2011/0137458 A1 | 6/2011 | Hisatani et al. | |
| 2011/0186077 A1* | 8/2011 | Thompson et al. | 134/6 |
| 2012/0036676 A9* | 2/2012 | Ota | 15/405 |
| 2012/0125367 A1* | 5/2012 | Monkman et al. | 134/18 |
| 2012/0152877 A1* | 6/2012 | Tadayon | 212/224 |
| 2012/0285516 A1 | 11/2012 | Mckarris | |
| 2013/0206173 A1* | 8/2013 | Zijlstra | 134/6 |

OTHER PUBLICATIONS

"Electrostatic Surface Cleaning", Science Daily—www.sciencedaily.com/releases/2009/10/091007091647.htm, (Oct. 12, 2009).

"Hector—Heliostats Cleaning Team Oriented Robot", SENER—Aerospace Highlights—www.sener-aerospace.com/AEROESPACIAL/ProjectsD/hector-cleaning-robot-system-for-heliostats/en, (2013).

"Mitigation of lunar dust on solar panels and optical elements utilizing electrostatic traveling-wave", Journal of Electrostatics vol. 69, Issue 4, (Aug. 2011), pp. 370-379.

"Modular and Scalable Concentrating Solar Thermal Power (CSP)", eSolar.Sa—Utiltiy Scale Solar Power—Power Point.

"Sensors and Actuators A: Physical", vol. 73, Issues 1-2, (Mar. 9, 1999), pp. 37-44.

"Some techniques on electrostatic separation of particle size utilizing electrostatic traveling-wave field", Journal of Electrostatics vol. 66, Issues 3-4,, (Mar. 2008), pp. 220-228.

Atten, P., "Study of Dust Removal by Standing-Wave Electric Curtain for Application to Solar Cells on Mars", Browse Journals & Magazines > Industry Applications, IEEE T . . .> vol. 45 Issue:1, (Jan.-Feb. 2009).

Calle, C.I., et al., "Dust Particle Removal by Electrostatic and Dielectrophoretic Forces With Applications to NASA Exploration Missions", Proc. ESA Annual Meeting on Electrostatics 2008, Paper O1, (2008), 1-14.

International Application Serial No. PCT/US2013/061731, International Search Report mailed Jan. 30, 2014, 2 pgs.

International Application Serial No. PCT/US2013/061731, Written Opinion mailed Jan. 30, 2014, 4 pgs.

* cited by examiner

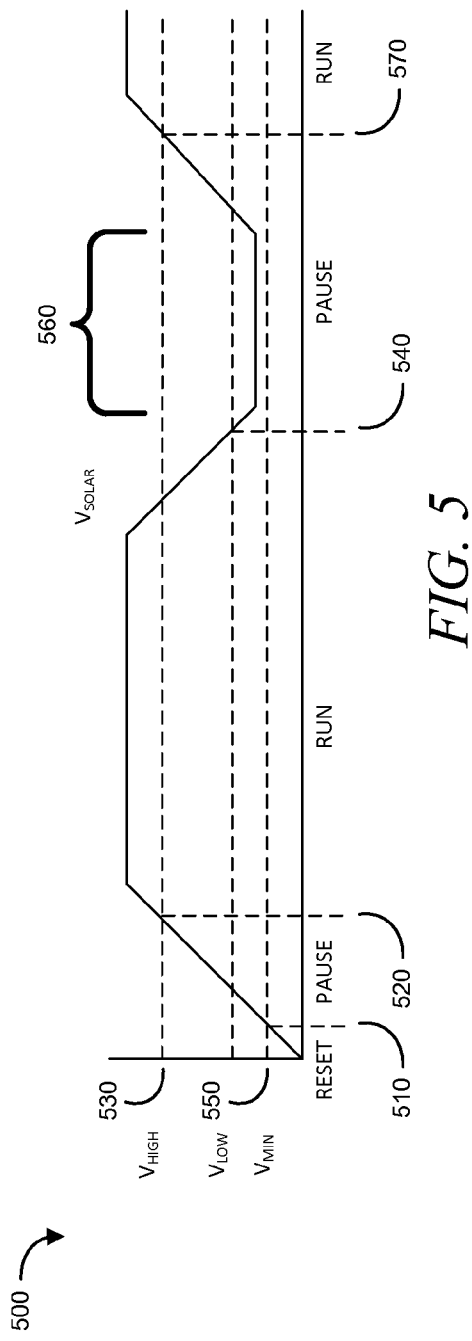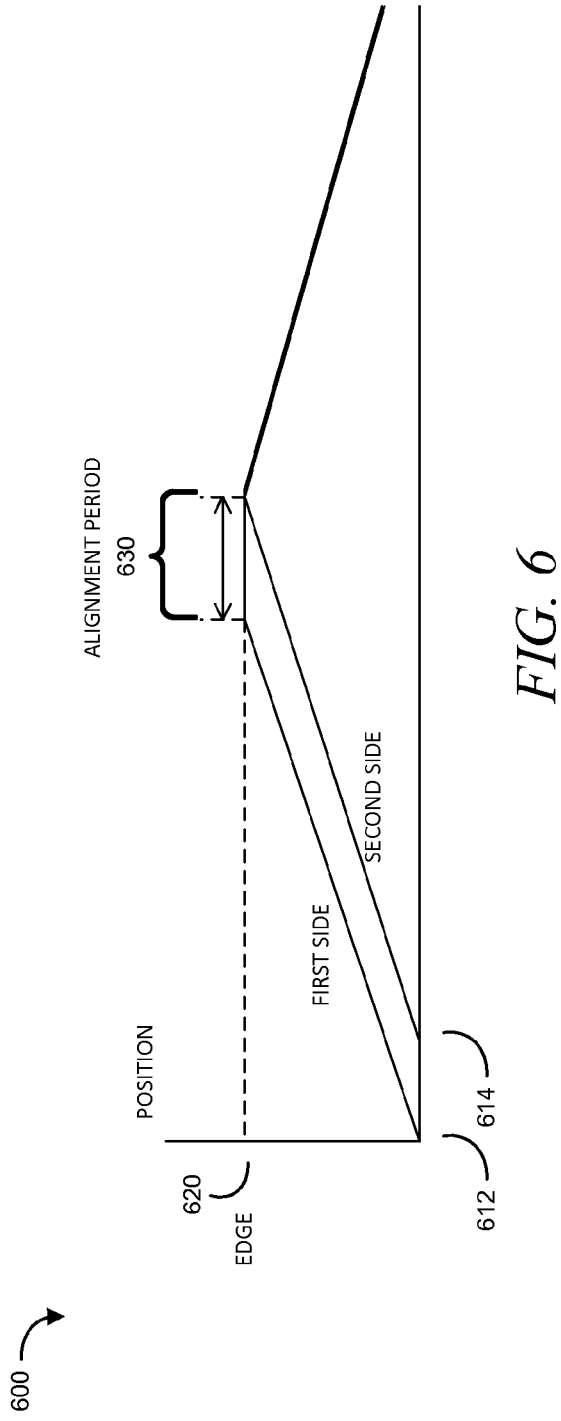

AUTOMATIC SOLAR POWER SURFACE-CLEANER

This application claims the benefit of U.S. Provisional Application No. 61/708,529, filed Oct. 1, 2012, the entirety of which is incorporated herein by reference.

BACKGROUND

This disclosure relates generally to the cleaning of surfaces used to generate solar power. Solar power surfaces can include photovoltaic (PV) solar cells, mirrors used in concentrating solar power (CSP) plants, and other surfaces used in association with generating power from solar energy. One example of a CSP plant can include a power tower, which can use an array of solar tracking mirrors such as heliostats to focus light energy toward the top of a tower to generate steam to power one or more generators. To improve power output, solar power surfaces can be cleaned. Because of the large number of solar power surfaces in a typical plant, the cost of cleaning can be undesirably large.

Additionally, solar power installations can be situated in desert areas where water can be scarce. According to one cleaning approach, a truck is driven through a solar plant location as an operator directs a pressurized stream of water, such as deionized water, onto a mirror surface. While this process can be effective at cleaning mirrors, it is resource intensive, both in terms of man-hours and water consumption, and therefore is performed periodically, such as once every two weeks. In between such cleanings, surfaces can again become undesirably contaminated.

BRIEF DESCRIPTION OF THE DRAWINGS

FIG. 5 is a timing diagram of the power control algorithm, according to an embodiment.

FIG. 6 is a diagram of the alignment algorithm, according to an embodiment.

DETAILED DESCRIPTION

Various embodiments include at least one of systems, methods, and software to facilitate automatic (e.g., autonomous) solar power surface-cleaning. Solar power surfaces can include, but are not limited to, photovoltaic (PV) solar cells, mirrors used in Concentrating Solar Power (CSP) plants, other surfaces, and combinations thereof. Surfaces can be used to generate solar power either directly or indirectly. Embodiments can include at least one automatic solar power surface-cleaning robot. A robot can use little or no water and little or no external power. A robot can intermittently (e.g., frequently or continuously) move debris from the solar power surfaces and can require little or no maintenance or external power. In addition to having autonomous capability, the solar power surface-cleaning robot can be retrofit to a solar energy collecting or reflecting surface.

An automatic solar power surface-cleaner can address some or all of these considerations using a solar-powered electrostatic surface-cleaning robot. The robot can move itself over the solar energy collecting or reflecting surface, and can move debris using high-voltage AC (e.g., AC voltage greater than one thousand volts RMS) electric fields to move particulates and debris as the robot moves itself over the solar energy collecting or reflecting surface. The debris can be charged by the applied electric fields. Attractive and/or repulsive forces can be created by the interaction of the charged particulates with the AC fields.

Photovoltaic solar cells can supply the power for the robot. Such a configuration can be self-powered, avoiding external wiring to a grid or another power source. The robot can operate with little or no power collected from remote sources. The robot can clamp to the target surface to be cleaned at the edges using motor driven rollers. Electronics inside the robot can generate high-voltage AC that can be applied to conductors close to the surface to be cleaned.

Figure 1:
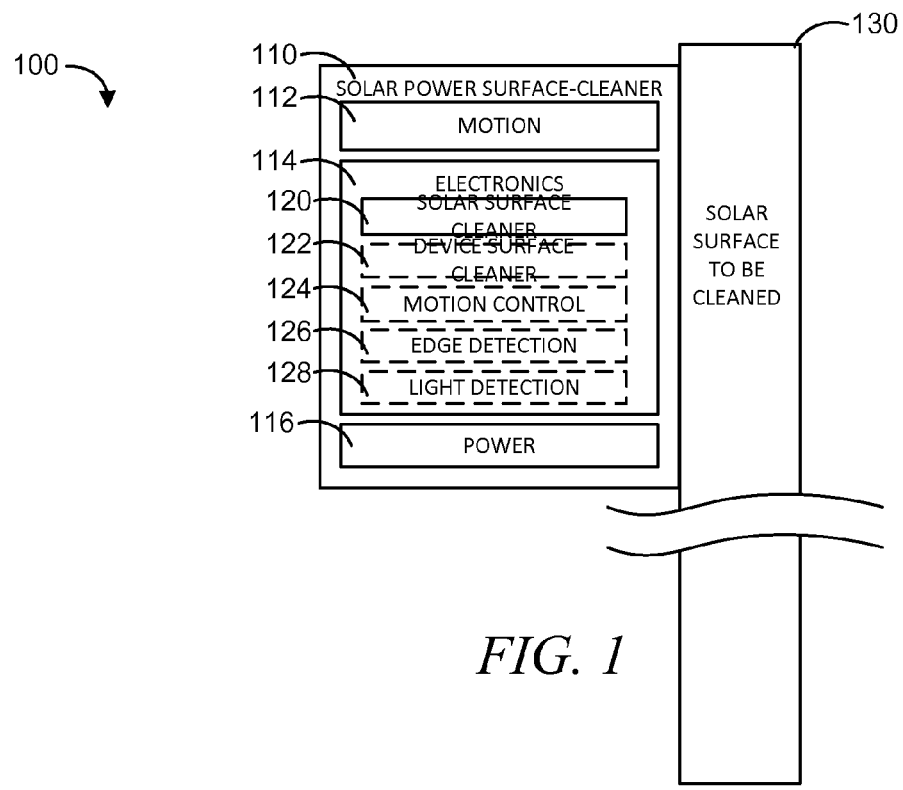
FIG. 1 shows a block diagram of an automatic solar power surface-cleaner and surface, according to an embodiment.

FIG. 1 shows a block diagram of an automatic solar power surface-cleaner and surface 100, according to an embodiment. The solar power surface-cleaner 110 can include a motion module 112 to move the solar power surface-cleaner 110, electronics 114, and a power module 116 to power the electronics 114 and to power the motion module 112. The electronics 114 can include a solar surface-cleaning module 120. The electronics can optionally include a cleaning device surface-cleaning module 122, a cleaning device motion control module 124, an edge detection module 126, or a light detection and power management module 128. The solar power surface-cleaner 110 can be attached to a surface to be cleaned 130.

Figure 2:
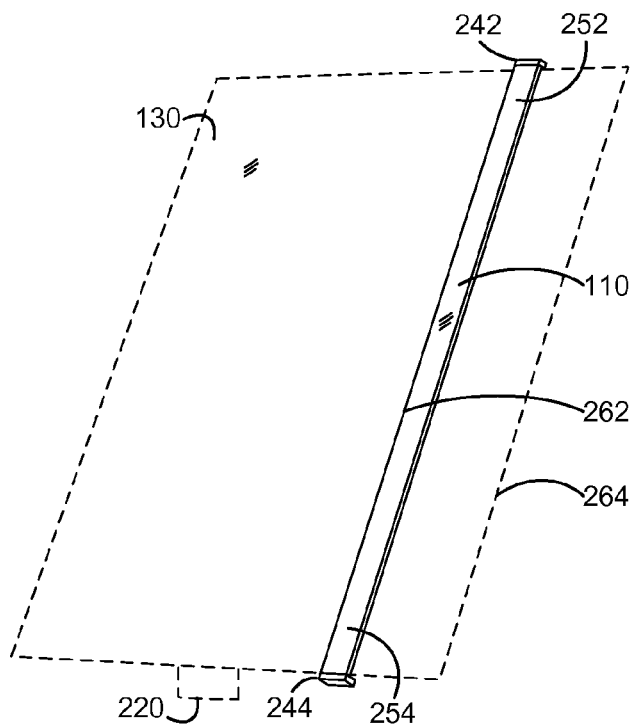
FIG. 2 shows an automatic solar power surface-cleaner and surface, according to an embodiment.

FIG. 2 shows an automatic solar power surface-cleaner and surface 200, according to an embodiment. The automatic solar power surface-cleaner 110 can be mounted on a solar power surface to be cleaned 130. The solar power surface to be cleaned 130 can be supported by a columnar support structure 220. The automatic solar power surface-cleaner 110 can include a first assembly 242 on a first end 252 and a second assembly 244 on a second end 254. The first assembly 242 can be a driver assembly to move the automatic solar power surface-cleaner 110. The second assembly 242 can be a driver assembly or a roller assembly. A roller assembly can support the second end 254. A roller assembly can include low-friction axels and low rolling friction rollers to promote movement of the automatic solar power surface-cleaner 110. A driver assembly example is described in detail in FIG. 3.

The automatic solar power surface-cleaner 110 can be mounted on a solar power surface to be cleaned 130 by aligning a first automatic solar power surface-cleaner edge 262 with a first solar power surface to be cleaned edge 264, aligning the solar power surface to be cleaned edge 264 with the first drive assembly 242 and the second drive assembly 244, and moving the automatic solar power surface-cleaner 110 toward the center of the solar power surface to be cleaned 130.

Figure 3:
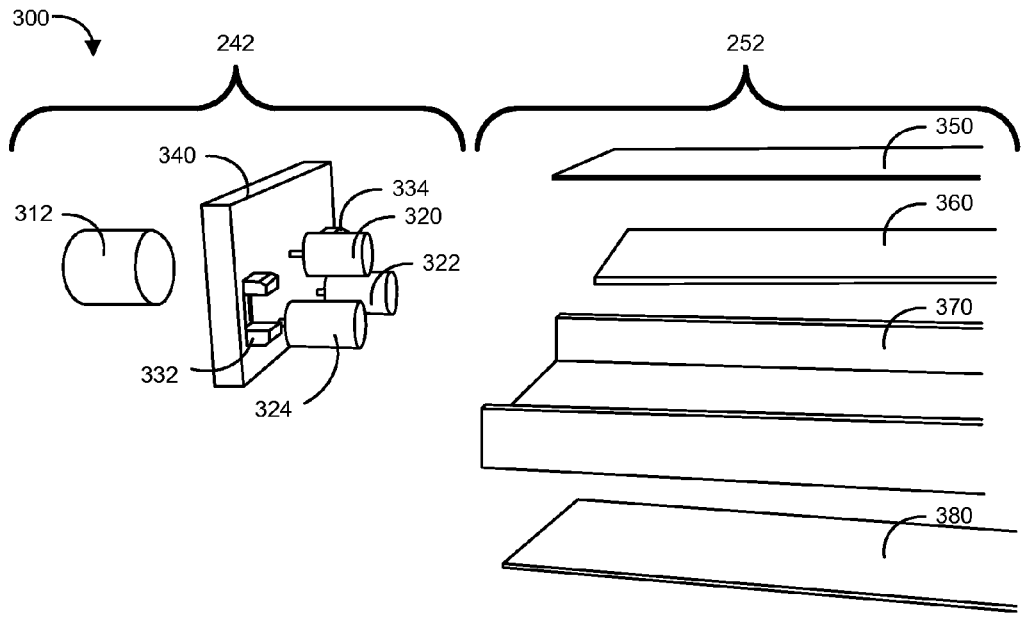
FIG. 3 is an exploded view of one end of an automatic solar power surface-cleaner and driver assembly, according to an embodiment.

FIG. 3 is an exploded view 300 of one end of an automatic solar power surface-cleaner and driver assembly, according to an embodiment. An automatic solar power surface-cleaner can include a first driver assembly 242 on a first end 252. The automatic solar power surface-cleaner 210 can include a roller assembly 244 on a second end 254. An automatic solar power surface-cleaner can include a first driver assembly on a first end and a second driver assembly on the second end, e.g., each can include the components in FIG. 3. Motor 312 can drive roller 320, which can clamp surface to be cleaned 130 against idle rollers 322 and 324. Edge detectors 332 and 334 can be used to detect the edges of the surface to be cleaned 130. The edge detector can include one or more of a capacitive sensor, Doppler sensor, inductive sensor, infrared sensor, laser rangefinder, magnetic sensor, optical sensor, reflective photocell sensor, radar, sonar, and combinations thereof.

Side plate 340 can provide a mount for the motor, rollers, and sensors. Solar cell array 360 can provide power for motor 312. Top glass 350 can protect the solar cell array. Conductors can be below top glass 350 or can be embedded within top glass 350. High-voltage AC can be commutated on the conductors to move debris from the top surface. Housing 370 can provide structural support and houses the electronics assemblies. Cleaning array 380 can contain multiple conductors on which high-voltage AC can be commutated to lift particulates and debris from the surface to be cleaned 130, or to move particulates and debris off of (e.g., over) the surface of the surface to be cleaned 130.

The solar power surface-cleaner can be clamped to a surface at each of two edges by force exerted between the drive roller 320 and the two idle rollers 322 and 324. The three rollers can be arranged in a triangle, with a single drive roller 320 on one side of a surface to be cleaned 130, and two spring-loaded idle rollers 322 and 324 on the side of the surface to be cleaned 130 opposite the drive roller 320. Other track devices can be used to move the solar power surface-cleaner over the surface. According to some embodiments, the configuration can include one drive roller 320 and two idle rollers 322 and 324. Such a configuration can provide for quick installation, at least because the solar power surface-cleaner can be mounted on a solar power surface to be cleaned without disassembly. As discussed above, the automatic solar power surface-cleaner 110 can be mounted on a solar power surface to be cleaned 130 by aligning the first automatic solar power surface-cleaner edge 262 with the first solar power surface to be cleaned edge 264, aligning the solar power surface to be cleaned edge 264 with the first drive assembly 242, and moving the automatic solar power surface-cleaner 110 toward the center of the solar power surface to be cleaned 130. A stepper motor can be used to drive the drive roller 320 can provide deterministic positioning. A stepper motor can provide high holding torque during periods when the solar power surface-cleaner is off.

Roller size can be selected to utilize a high motor-roller gear ratio to provide high torque at low motor speed. A relatively high torque of four thousand gram-centimeters of motor-holding torque can be applied to a one half-inch diameter drive roller 320. The drive roller 320 and idle rollers 322 and 324 can be formed of neoprene. Increased spring force holding to roller to the surface can increase drive friction. For example, ten kilograms of spring force can be applied to urge the drive roller 320 against the surface can result in friction between the roller and the surface that can require three kilograms of drive friction to overcome. High holding torque and drive friction can withstand the forces from high winds or the streams of high-pressure water used in supplementary maintenance processes.

According to some embodiments, drive assemblies at each end can be resized to accommodate a predetermined planarity of the surface to be cleaned 130. The idle rollers 322 and 324 can each use spring-loaded suspension. According to some embodiments, compliant coupling to the main housing can be used. For example, compliant coupling can allow rotation of one drive relative to the other about two axes, where one axis can be in the plane normal to the surface to be cleaned 130, and where the second axis can be in the plane parallel with the surface to be cleaned 130. Use of compliant coupling can allow the solar power surface-cleaner to tolerate warping of the surface to be cleaned 130, such as temporary warping due to thermal expansion (e.g., elastic warping) or permanent warping due to thermal expansion (e.g., inelastic warping). In one embodiment, the main hosing can allow different size surfaces to be accommodated using varying numbers of sections. In another embodiment, intermediate idle rollers can be added at the edges of each section to prevent sagging of the solar power surface-cleaner over long spans.

Figure 4:
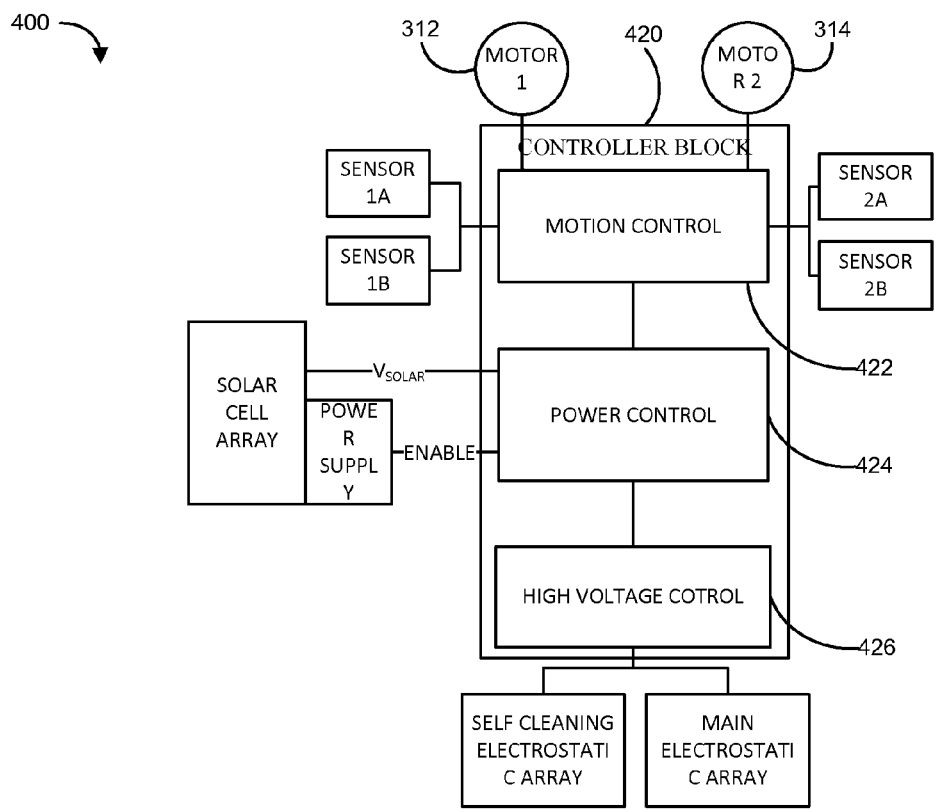
FIG. 4 is a block diagram of the system, according to an embodiment.

FIG. 4 is a block diagram of the system 400, according to an embodiment. A controller block 420 comprised of a microcontroller integrated circuit and associate support circuitry and software can control the operation of one or more of three subsystems: the motor subsystem 422, the power subsystem 424, and the cleaning subsystem 426. Two motors, 312 and 314, can be used to drive the solar power surface-cleaner over the surface to be cleaned 130. As discussed above, stepper motors can be used. Such motors can provide deterministic positioning and high holding torque during periods when the solar power surface-cleaner is off. Other motors can be used.

FIG. 5 is a timing diagram 500 of the power control algorithm, according to an embodiment. A solar array can provide power for the solar power surface-cleaner. DC-to-DC converters in the power supply can convert the power from the cells to the various system power supply levels. Because secondary battery technologies have shorter life than desired for this automatic solar power surface-cleaner, the solar power surface-cleaner can operate using short-term storage in the form of capacitors. It can be important, therefore, to shut down gracefully as the sunlight fades. The solar cell voltage can be monitored by the controller, which can control the power supply in response to the solar voltage The light detection and power management module 128 can use the timing diagram 500 of the power control algorithm to manage power from a solar array. When there is little or no sun 510, the system controller can be held in reset with the power supplies disabled. When the solar cells begin producing a voltage 520 of Vhigh 530, the power supply can be enabled 530 and the solar power surface-cleaner transitions to a run state. When the sun is obscured by clouds and the solar cell voltage drops 540 temporarily below Vlow 550, the solar power surface-cleaner can be put in to a PAUSE state 560 where the power supplies can be disabled and the solar power surface-cleaner does not operate. An automatic solar power surface-cleaner can return to the run state as soon as the solar cell voltage once again exceeds Vhigh 570. The voltage difference between Vhigh 570 and Vlow 550 can operate as a hysteresis to reduce oscillations in state transitions due to voltage fluctuations.

FIG. 6 is a diagram of the alignment algorithm 600, according to an embodiment. FIG. 6 shows the position of a first side 612 and of a second side 614 relative to a solar power surface to be cleaned edge 620 as a function of time. When an automatic solar power surface-cleaner is misaligned, one edge detector can reach the edge 620 before the other. Here, the first side 612 reaches the edge 620 before the second side 614. The first side motor will pause during the alignment period 630 as the second side 614 reaches the edge 620. When both sides have reached the edge 620, the motor direction can be reversed.

Figure 7:
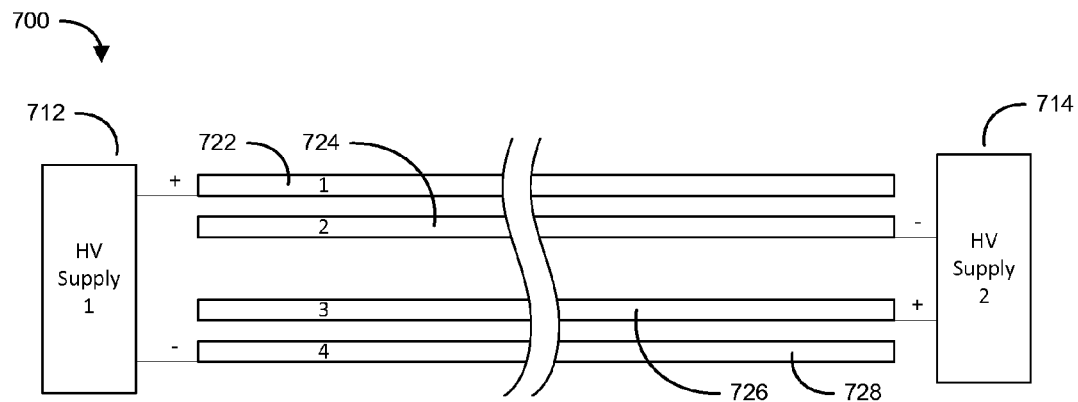
FIG. 7 shows a block diagram of a high-voltage supply and conductor arrangement, according to an embodiment.

FIG. 7 shows a block diagram of a high-voltage supply and conductor arrangement 700, according to an embodiment. The high-voltage supply and conductor arrangement 700 can be used to move dust both on the solar power surface being cleaned as well as on the cleaner's own top surface. The high-voltage supply and conductor arrangement 700 can include a first high-voltage supply 712 and a second high-voltage supply 714. The first high-voltage supply 712 controls a first positive contact 722 and a first negative contact 728. The second high-voltage supply 712 controls a second negative contact 724 and a second positive contact 1426.

Figure 8:
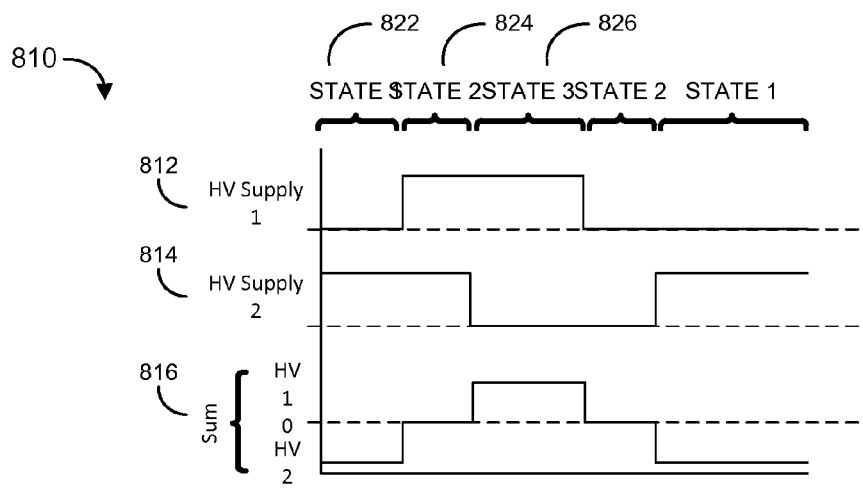
FIG. 8 shows the two-phase commutation waveforms used to commutate the multiphase high-voltage, according to an embodiment.

FIG. 8 shows the two-phase commutation waveforms 800 used to commutate the multiphase high-voltage, according to an embodiment. A three-state sequence is shown, including a first high-voltage supply waveform 812, a second high-voltage supply waveform 814, and the sum of the waveforms 816. In an embodiment, a three-state sequence can be generated using a first high-voltage supply 712 and a second high-voltage supply 714. Each high-voltage supply can have a positive conductor to generate a positive field and a negative conductor to generate a negative field. The field resulting from the positive and negative conductors from both high-voltage supplies is the sum of the fields 716. Each high-voltage supply can operate on a duty cycle of fifty percent, though the duty cycle can be increased or decreased. The duty cycle can be altered based on available power, or the duty cycle can be altered to affect particulates of different sized. The sum of the fields 816 can include a first state 822, a second state 824, and a third state 826. For example, the first state 822 can include the first high-voltage supply 712 set low, the second high-voltage supply 714 set high, and the sum of the fields 816 is positive in the direction of the second voltage supply. In another example, the second state 824 can include the first high-voltage supply 712 set high, the second high-voltage supply 714 set high. Because the fields from the two supplies cancel each other out, the sum of the fields 816 is neutral. In another example, the third state 826 can include the first high-voltage supply 712 set high, the second high-voltage supply 714 set low, and the sum of the fields 816 is positive in the direction of the first voltage supply. The sum of the fields 816 indicates the three states repeat in the sequence {one, two, three, two}, however different state sequences can be used.

Figure 9:
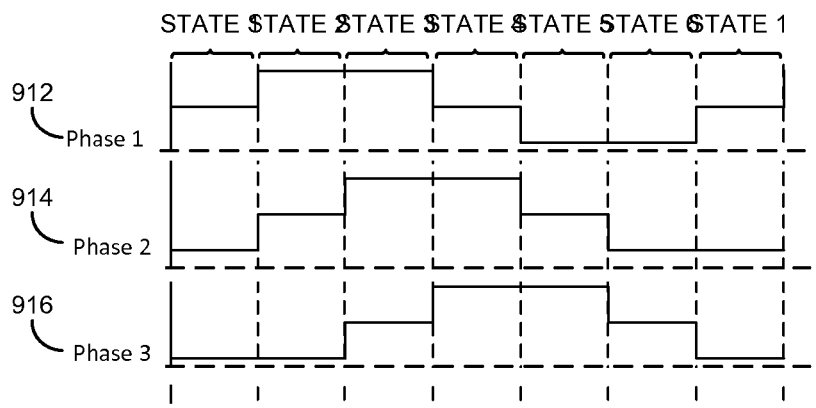
FIG. 9 is a diagram of commutation waveforms, according to an embodiment.

FIG. 9 is a diagram of commutation waveforms 900, according to an embodiment. FIG. 9 shows three-phase commutation waveforms 900 used to commutate the multiphase high-voltage, according to an embodiment. A six-state sequence is shown. A six-state sequence can include a first high-voltage supply waveform 912, a second high-voltage supply waveform 914, and a third high-voltage supply waveform 916. In an embodiment, a three-state sequence can be generated using three high-voltage supplies. Each high-voltage supply can have a positive conductor to generate a positive field and a negative conductor to generate a negative field. The field resulting from the positive and negative conductors from the three high-voltage supplies can be the sum of the fields. Each high-voltage supply can operate on a duty cycle of one-third, though the duty cycle can be increased or decreased.

The frequency of these waveforms can be varied to move particulate of varying sizes. Lower frequencies can be effective in moving large particulates. High frequency waveforms can be effective in moving smaller, lighter particulates. This automatic solar power surface-cleaner can modulate the commutation frequency to sweep through frequencies appropriate for a wide range of particulate sizes. For example, a commutation frequency can sweep through a range of ten hertz to one hundred hertz and back to one hertz at a rate of one hertz per millisecond. A speed of motion of the automatic solar power surface-cleaner of fifty inches per minute can be combined with a frequency can sweep through a range of ten hertz to one hundred hertz and back to one hertz at a rate of one hertz per millisecond to move particulates effectively. Other motion speeds, commutation frequency ranges, commutation frequency sweep frequency steps, and commutation frequency sweep rates can be used.

Figure 10:
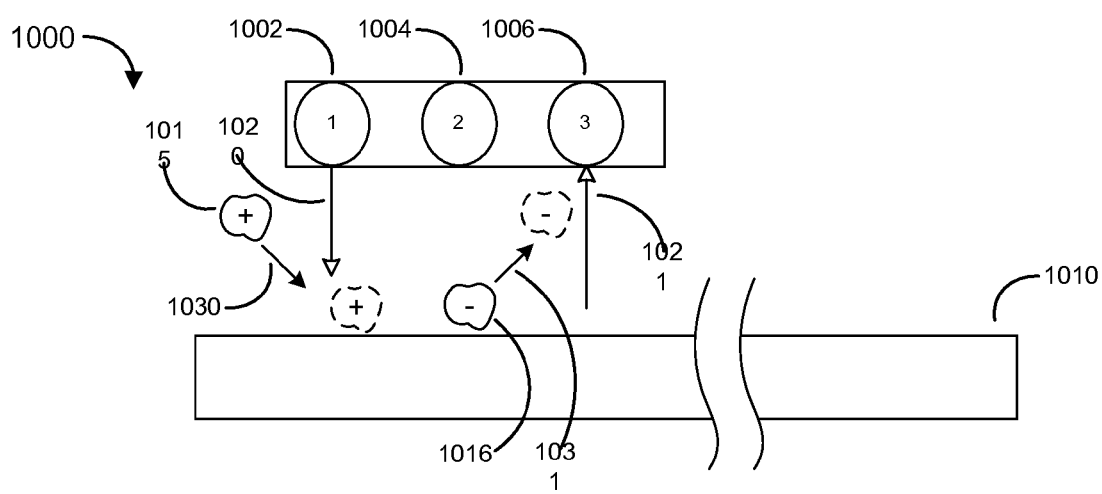
FIG. 10 is a diagram of the electrostatic cleaning array according to an embodiment.

FIG. 10 is a diagram of the electrostatic cleaning array 1000 according to an embodiment. In one state of a commutation sequence, the first conductor of the array 1002 can apply a positive potential toward the surface to be cleaned 1010, resulting in a positive electric field 1020. The second conductor 1004 can be at a neutral, ground potential and has no field. The third conductor 1006 can have a negative potential applied, resulting in a negative electric field 1021. Positively charged particulate 1015 can interact with positive electric field 1020 and negative electric field 1021 to create a force represented by a directional vector 1030. The positive electric field 1020 and the negative electric field 1021 can move the positively charged particulate 1015 towards the surface to be cleaned 1010 and to the right. In a subsequent state of a commutation sequence, the electric field 1020 can be negative and the electric field 1021 can be positive, and negatively charged particulate 1016 can interact with negative electric field 1020 and positive electric field 1021 to create force represented by a directional vector 1031. The negative electric field 1020 and positive electric field 1021 can move the negatively charged particulate 1016 away from the surface to be cleaned 1010 and toward the third conductor 1006.

As each state advances in a commutation sequence, the electric fields can cycle through a positive polarity, neutral polarity, and a negative polarity. As described above, a first state can include the first conductor 1002 applying a negative potential, the second conductor 1004 applying a neutral potential, and the third conductor 1006 applying a positive potential. In an example, the second state can include the first conductor 1005 applying a neutral potential, the second conductor 1004 applying a positive potential, and the third conductor 1006 applying a neutral potential. Because the first state changes the charges on the particulates, the second state can exert a force on the particulates. The third state can include the first conductor 1005 applying a positive potential, the second conductor 1004 applying a neutral potential, and the third conductor 1006 applying a negative potential. Because the third state can change the charges on the particulates, the third state can exert a force on the particulates.

As the commutation sequence proceeds, the states can include a shifting and reversal of the polarity: if the first conductor 1002 in the first state applies a positive potential, then the second conductor 1004 in the second state can have a negative potential, and the third conductor 1006 in the third state can have a positive potential. In this example, the positive potential of the first conductor 1002 in the first state can change the charge on the particulate from positive to negative, enable the negative potential of the second conductor 1004 in the second state to exert a force on the negatively charged particulate, and change the particulate charge to positive. Similarly, the positive potential of the third conductor 1006 in the third state can exert a force on the positively charged particulate.

In a three-state commutation sequence, the electric fields can cycle through two states: a positive polarity and a neutral polarity. As described above, a first state can include the first conductor 1002 applying a positive potential, the second conductor 1004 applying a neutral potential, and the third conductor 1006 applying a positive potential. The second state can include the first conductor 1005 applying a neutral potential, the second conductor 1004 applying a positive potential, and the third conductor 1006 applying a neutral potential. The third state can include the first conductor 1005 applying a positive potential, the second conductor 1004 applying a neutral potential, and the third conductor 1006 applying a positive potential. Because of the forces exerted on the particulates, and because of the motion of the conductors, the conductors can move debris in the direction of the conductor motion.

Figure 11:
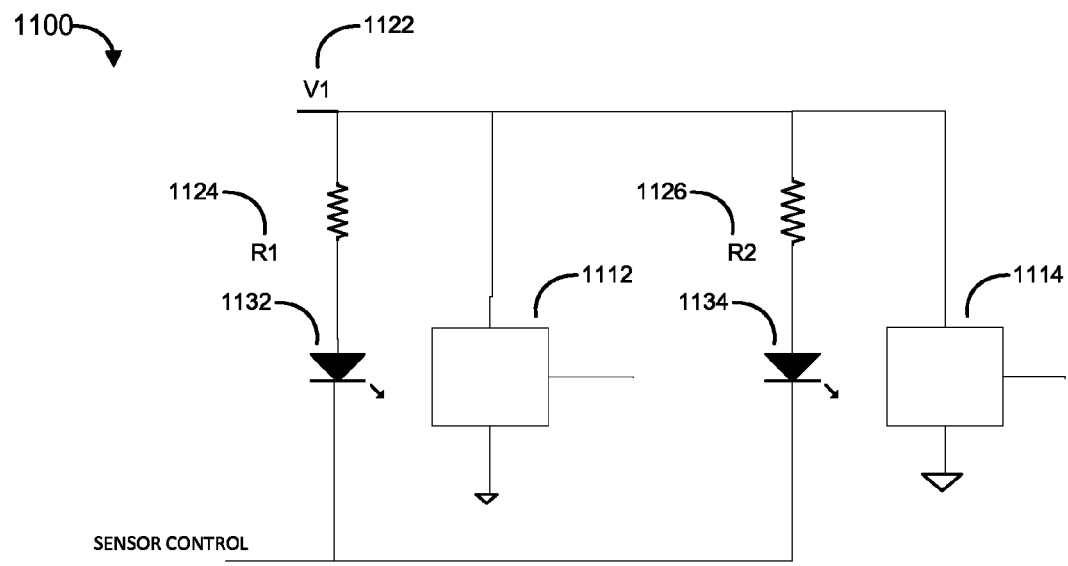
FIG. 11 shows a schematic of edge detectors, according to an embodiment.
Figure 12:
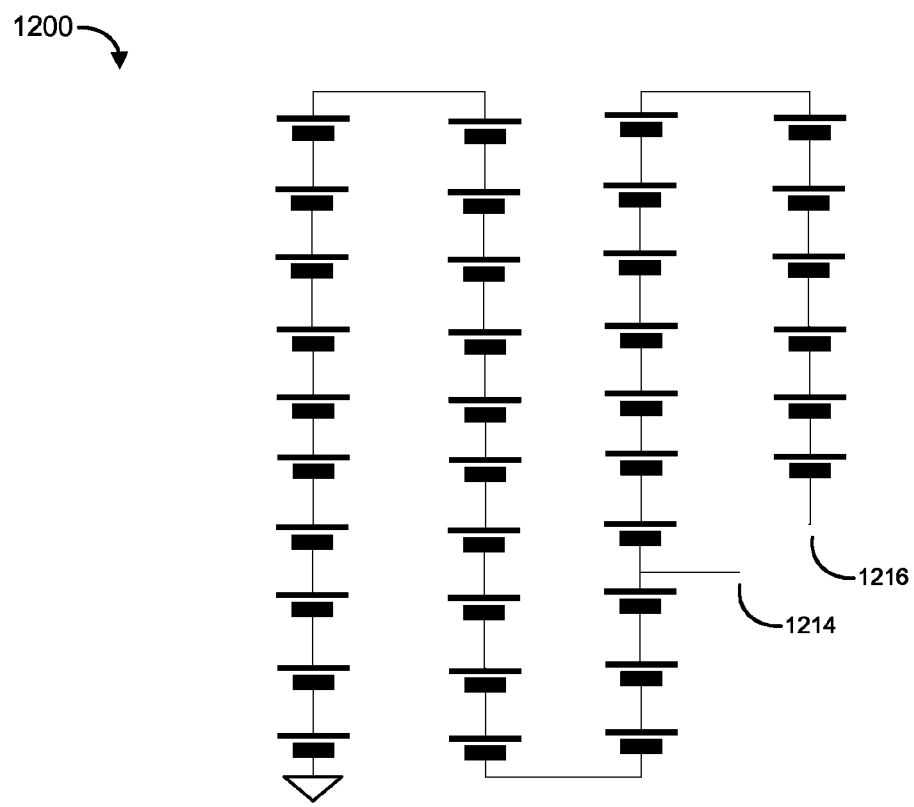
FIG. 12 shows the connection of the photovoltaic cells, according to one embodiment.
Figure 13:
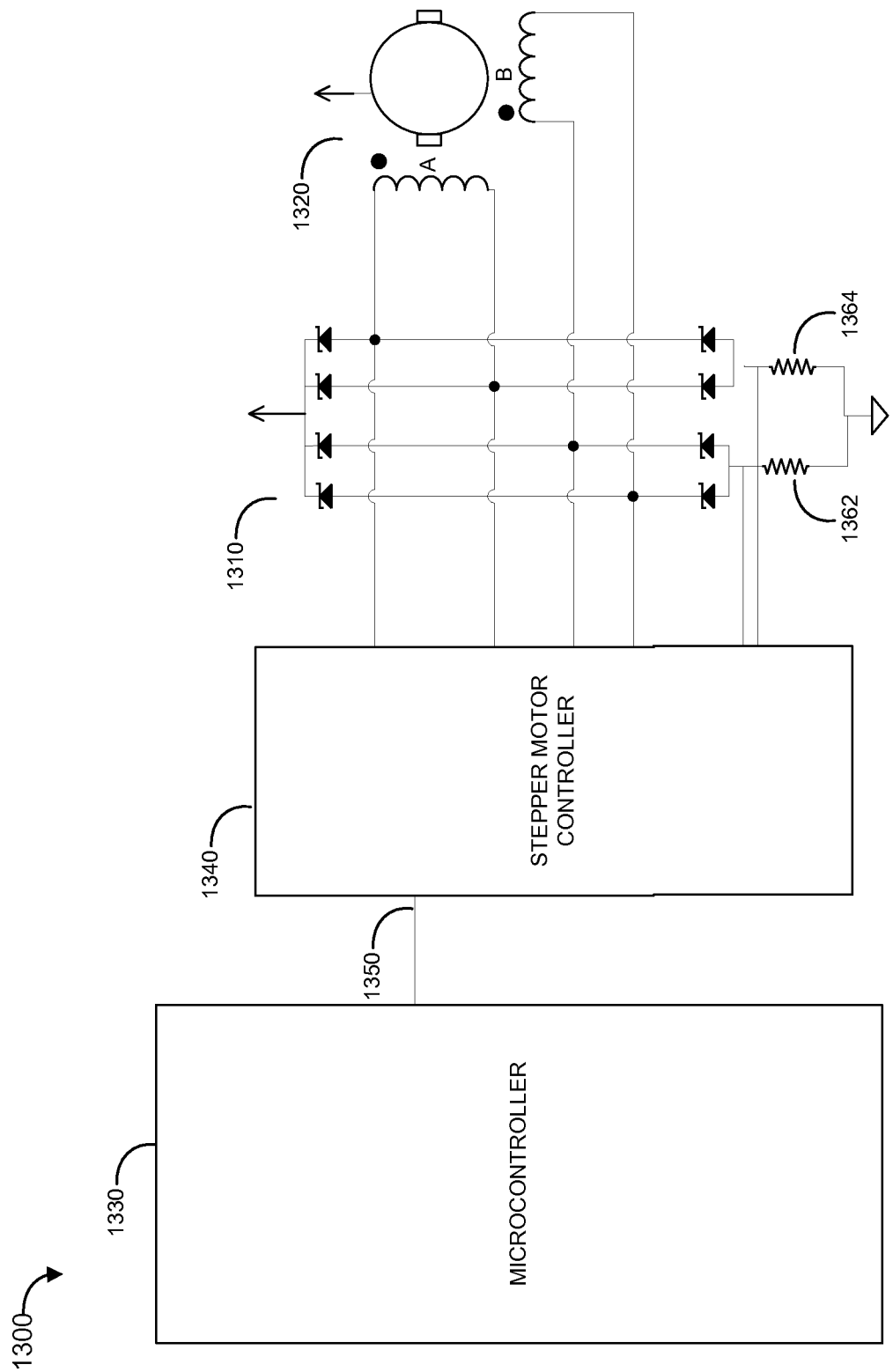
FIG. 13 is a schematic diagram of the controller and stepper motor drivers, according to an example embodiment.

FIG. 11 through FIG. 13 are schematics of the electronics 1100-1300, according to an embodiment. FIG. 11 shows a schematic of edge detectors 1100, according to an embodiment. Two optical through-beam sensors 1112 and 1114 can detect a single edge. Two additional sensors can detect the opposite edge. Through-beam optical sensors can be used to perform edge detection. Other edge detection methods can be used. Inductive sensors can be used for edge detection, as inductive sensors exhibit relative immunity to ambient light. A first voltage 1124 can be connected to a first resistor 1124 and a second resistor 1126. The first voltage 1124 can bias sensors 1112 and 1114 for high emitter current. By biasing sensors 1112 and 1114 for high emitter current, the voltage 1124 can decrease the sensitivity of sensors 1112 and 1114 to ambient light. The emitters 1132 and 1134 can be pulsed by software using a "SENSOR CONTROL" signal, which can provide further discrimination against ambient noise. When a pulsed technique is used, the pulse width of the sensor output can be measured by timers in the microcontroller. The pulse width can be compared to the width of the emitter pulses, and any significant mismatches can be rejected as noise. While the pulsed mode has the advantage of being able to discriminate against noise, it can increase the probability of rejecting an actual edge event. Physical shades can surround the sensors to reduce ambient light.

FIG. 12 shows the connection of the photovoltaic cells 1200, according to one embodiment. A solar cell stack can use thirty-six photovoltaic cells connected in series. Each cell can measure approximately seventy-five by fifty millimeters. Each cell can generate from fifty one-hundredths to fifty one-hundredths of a volt at approximately one ampere of current. At bus voltage node 1216, photovoltaic solar array can supply a bus voltage of eighteen to twenty volts at eighteen watts of power. A first DC-to-DC converter can convert the bus voltage to five volts to power the microcontroller. A second DC-to-DC converter can convert the bus voltage to twelve volts to supply MOSFET gate drive for the motors and high-voltage switches. The raw bus voltage can be used as the motor supply current. The DC-to-DC converters can be eliminated by taking multiple voltage taps from the solar cell stack, instead taking five volts voltage from the tenth cell at bus voltage node 1214. Voltage can be taken off the twenty-fourth cell at bus voltage node 1216, generating a nominal twelve volts.

FIG. 13 is a schematic diagram of the controller and stepper motor drivers 1300, according to an example embodiment. Microstepping can be used to vibration. For example, microstepping can apply near-sinusoidal winding currents to the stepper motor, which can result in smoother motion. Commutation tables in software can record the commutation sequence as analog motor current values. A data table in the microcontroller 1330 memory can contain a sixty-four element representation of a sine wave quantized with ten bits of resolution. Two software pointers can address the table, generating sequences of values representing two sine waves ninety degrees out of phase. A synchronous serial communications interface 1350 can communicate the sequences of values to the stepper motor controller 1340. Sense-resistors 1362 and 1364 can measure the motor currents. Logic in the stepper motor controller can alter the output Pulse-Width Modulated (PWM) switching waveforms so the current in the windings of stepper motor 1320 approximates the values from the microcontroller. A bipolar MOSFET drive can provide increased precision for current control. External Schottky freewheeling diodes 1310 can increase recovery of freewheeling current from the motor windings. Motor speeds can be varied by indexing through the commutation tables in varying step increments. A sixty-four-element table with a commutation rate of one millisecond an increment of sixteen elements increases stepping rate while reducing motor stall conditions. A commutation rate of one millisecond with an increment of sixteen elements can result in the stepping waveforms consisting of sixteen discrete current levels quantized to ten bits of resolution. Using a thirty-to-one gear ration and a one half inch diameter drive roller, a motor speed of nine-hundred and sixty RPM can move the automatic solar power surface-cleaner at a rate of fifty inches per minute. Alternate motor drives can reduce cost and improve reliability. Standard half-step or full-step square wave commutation can reduce the need for the micro stepping drive chips. Replacing the bipolar drive with a unipolar drive can reduce cost by reducing the number of required power switches and freewheeling diodes.

A constant rate of fifty inches per minute can decrease system complexity and increase system reliability. For example, some automated consumer cleaning devices can detect an amount of particulates, and perform focused cleaning (e.g., spot cleaning) By using a constant rate of motion, an automatic solar surface-cleaner can operate without a particulate sensor or the feedback control loop required to support focused cleaning. Similarly, some automated consumer cleaning devices can be commanded to perform a cleaning immediately or at a future time. By excluding a manual activation mode, an automatic solar surface-cleaner can operate without input devices or other control mechanism required to support a manual activation mode.

Figure 14:
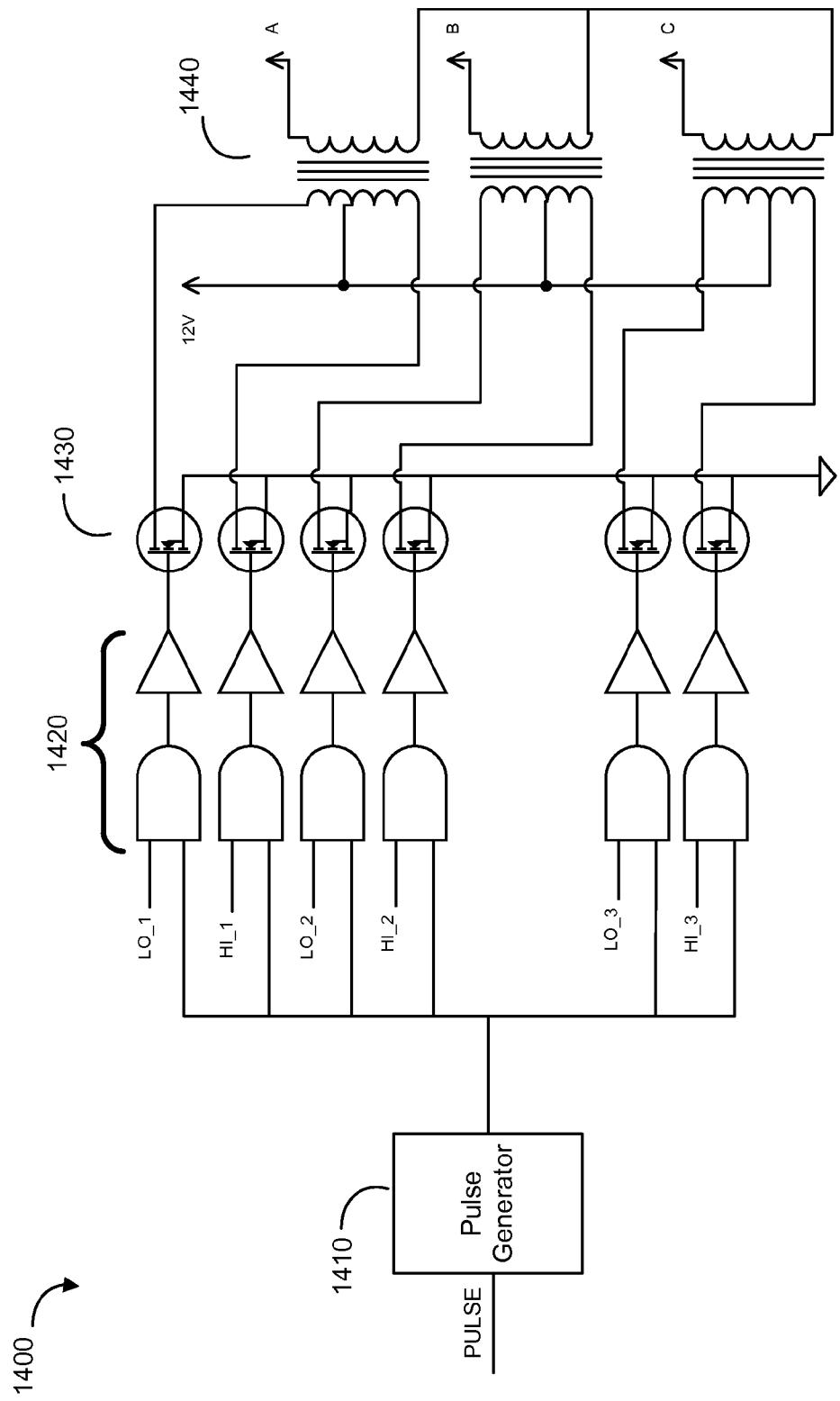
FIG. 14 is a schematic diagram for the high-voltage generation circuitry, according to an embodiment.

FIG. 14 is a schematic diagram for the high-voltage generation circuitry 1400, according to an embodiment. High-voltage can be generated using flyback transformers. Flyback transformers can use ferrite pot cores 1440 with fifteen turns of thirty-two-gauge wire in the primary coil, with two thousand turns of forty-gauge wire in the secondary coil. Other flyback transformer configurations can be used. A small gap (e.g., one ten-thousandths of an inch gap) between two halves of the core can allow energy to be stored in the form of a magnetic field. When the magnetic field is switched off, the primary winding current can collapse, and stored energy can be delivered to the secondary winding. MOSFET switches 1430 can control the primary currents by driving the MOSFET switches. Using the commutation waveforms of FIG. 6, the microcontroller can generate signals LO-1, HI__1, LO__2, HI__2, LO__3, HI__3, and PULSE. Pulse generator 1410 can open each switch if microcontroller operation halts. By using a primary coil with its center tap connected to the DC bus and two MOSFET switches to switch the other taps to ground, bipolar currents can be generated. High-voltage pulses, limited only by the load characteristics, can result on the secondary coils at phase outputs A, B, and C. High-voltage pulses can be applied to the conductor array 380 or conductors under or embedded within top glass 350.

Figure 15:
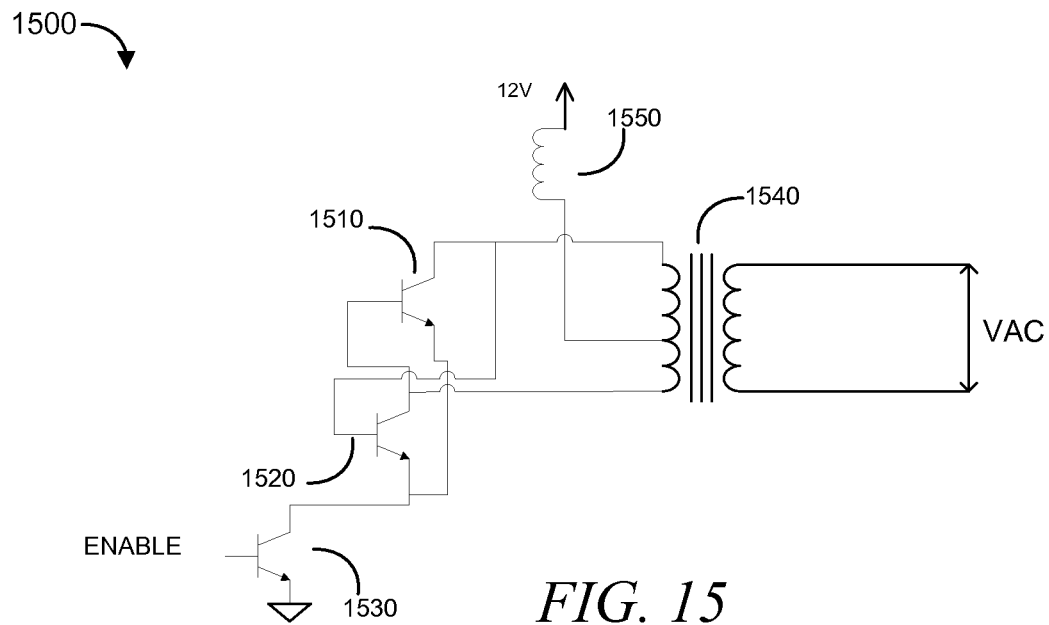
FIG. 15 is a schematic diagram for the sinusoidal high-voltage waveform generation circuitry, according to an embodiment.

FIG. 15 is a schematic diagram for the sinusoidal high-voltage waveform generation circuitry 1500, according to an embodiment. High-voltage generation can include difficulty in controlling flyback energy in the primary coils. Schottky diodes can shunt flyback currents to the DC bus, but this can generate voltage spikes on the bus. The voltage spikes could be reduced with transient voltage suppressors, but transient voltage suppressors can cause large current pulses into the ground node. Sinusoidal high-voltage waveform generation circuitry 1500 can generate a continuous sinusoidal high-voltage waveform, and can provide an alternative to the flyback technique. A Royer oscillator can be used to generate twelve-hundred volts RMS AC with a frequency of thirty kHz. Transistors 1510 and 1520 can switch the primary winding of transformer 1540 with a high turn-ratio. The high-voltage waveform generation circuitry 1500 can be self-resonant with a frequency that depends on the value of inductor 1550. Transistor 1530 can allow the voltage to be turned on or off via an ENABLE signal. Two implementations of the high-voltage waveform generation circuitry 1500 can generate AC waveforms that can be rectified and multiplied by a high-voltage AC multiplier circuit. A high-voltage AC multiplier circuit is shown in FIG. 16.

Figure 16:
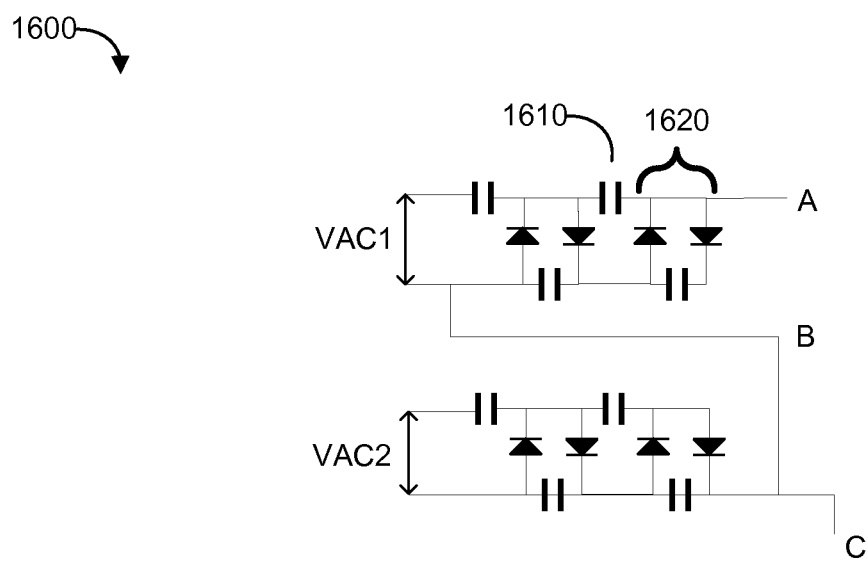
FIG. 16 is a schematic diagram for the high-voltage AC multiplier circuit, according to an embodiment.

FIG. 16 is a schematic diagram for the high-voltage AC multiplier circuit 1600, according to an embodiment. The high-voltage AC multiplier circuit can be a two-stage Villard cascade voltage multiplier, where each stage includes a capacitor 1610 and two diodes 1620. The two-stage circuitry 1600 can result in ten kilovolts DC. Four-millimeter spacing between conductors can create an average electric field of two-and-a-half kilovolts per millimeter (kV/mm). Because air breaks down at three kV/mm, two-and-a-half kV/mm can promote corona discharge to ionize the air while reducing generation of sparks. Reducing generation of sparks reduces power lost due to sparks, and decreases localized heating. Two high-voltage AC multiplier circuit can supply high-voltage DC sources capable of being pulsed. Software in the microcontroller can generate commutation signals to pulse the power supplies. The two AC circuits of FIG. 16 can be commutated in a two-state sequence generated from a lookup table in the microcontroller, where each phase can have a fifty-percent duty cycle.

In the preceding description, reference is made to the accompanying drawings that form a part hereof, and in which is shown by way of illustration specific embodiments that can be practiced. These embodiments are described in sufficient detail to enable those skilled in the art to practice the invention, and it is to be understood that other embodiments can be utilized and that structural, logical, and electrical changes can be made without departing from the scope of the present invention. Such embodiments of the inventive subject matter can be referred to, individually and/or collectively, herein by the term "invention" merely for convenience and without intending to limit the scope of this application to any single invention or inventive concept if more than one is in fact disclosed. The preceding description of embodiments is, therefore, not to be taken in a limited sense, and the scope of the present invention is defined by the appended claims.

The preceding description is, therefore, not to be taken in a limited sense, and the scope of the inventive subject matter is defined by the appended claims. The functions or algorithms described herein are implemented in hardware, software or a combination of software and hardware in one embodiment.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

The functions or algorithms described herein can be implemented in software or a combination of software and human implemented procedures in one embodiment. The software can consist of computer executable instructions stored on computer readable media such as memory or other type of storage devices. Further, such functions correspond to modules, which can be software stored on storage devices, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A solar power surface-cleaner system, comprising:
   a motor;
   electronics including a first cleaning head, the first cleaning head including:
      a first positive conductor and a first negative conductor;
      a second positive conductor and a second negative conductor, wherein the second positive conductor and the second negative conductor are arranged between the first positive conductor and the first negative conductor;
      a first high-voltage supply connected to the first positive conductor and to the first negative conductor;
      a second high-voltage supply connected to the second positive conductor and to the second negative conductor; and
      a controller configured to actuate the motor to move the first cleaning head with respect to the solar power surface, to activate the first high-voltage supply to apply a first multiphase high-voltage waveform to the first positive conductor and to the first negative conductor using a first duty cycle, and to activate the second high-voltage supply to apply a second multiphase high-voltage waveform to the second positive conductor and to the second negative conductor using a second duty cycle, wherein the first duty cycle is out of phase with the second duty cycle; and
   a power generator including at least one photovoltaic cell, wherein the power generator is configured to:
      power the motor to move the first cleaning head with respect to a solar power surface;
      power the controller; and
      power the first and second high-voltage supplies to generate a first electrostatic cleaning field around the first cleaning head to move particulates in the same direction as the first cleaning head;
   wherein moving the first cleaning head with respect to the solar power surface while the first electrostatic cleaning field is generated moves particulates off of the solar power surface.

2. The system of claim 1, wherein:
   the electronics include a second cleaning head configured to clean the at least one photovoltaic cell; and
   wherein the power generator is configured to power the generation of a second electrostatic cleaning field around the second cleaning head.

3. The system of claim 1, wherein the electronics include a first cleaning device motion control module configured to move the first cleaning head in at least a first direction.

4. The system of claim 1, wherein the electronics include a first edge detection module configured to detect a first edge of the solar power surface.

5. The system of claim 4, wherein the first cleaning device motion control module is configured to move the first cleaning head in at least a second direction, responsive to the first edge detection module detecting the first edge of the solar power surface.

6. The system of claim 4, wherein the electronics include:
   a second edge detection module configured to detect a second edge of the solar power surface; and
   a second cleaning device motion control module configured to:
      move the first cleaning head in at least a first direction; and
      move the first cleaning head in at least a second direction, responsive to the second edge detection module detecting the second edge of the solar power surface.

7. The system of claim 6, wherein:
   the first edge detector is configured to detect the first edge of the solar power surface at a first time;
   the second edge detector is configured to detect the second edge of the solar power surface at a second time, the second time occurring later than the first time; and
   the first cleaning device motion control module is configured to:
      suspend the motion of the first cleaning head, responsive to the first edge detector detecting the first edge of the solar power surface; and
      resume the motion of the first cleaning head, responsive to the second edge detector detecting the second edge of the solar power surface.

8. The system of claim 1, the electronics further including a light detection and power management module configured to detect when a voltage level generated by the at least one photovoltaic cell is higher than a first voltage threshold, wherein the first voltage threshold is higher than a minimum voltage required for operation of the power generator.

9. The system of claim 8, wherein the light detection and power management module is configured to:
   detect when the voltage level generated by the at least one photovoltaic cell is below a second voltage threshold, wherein the first voltage threshold is higher than the second voltage threshold;
   provide power to other modules within the electronics, responsive to the light detection and power management module detecting the voltage level generated by the at least one photovoltaic cell is above the first voltage threshold; and remove power from other modules within the electronics, responsive to the light detection and power management module detecting the voltage level generated by the at least one photovoltaic cell is below the second voltage threshold.

10. The system of claim 2, further comprising a substantially planar housing including:
   a first planar housing side attached to the first cleaning head and directed toward the solar power surface; and
   a second planar housing side attached to the at least one photovoltaic cell and directed away from the solar power surface.

* * * * *